(12) United States Patent
D'Alfonso

(10) Patent No.: US 6,191,544 B1
(45) Date of Patent: Feb. 20, 2001

(54) DEVICE FOR COMPENSATION OF VOLTAGE DROP AT LIGHT SOURCES OF A VEHICLE WITH ELECTRICAL AUXILIARY CHARGING DEVICE

(75) Inventor: Nuñzio D'Alfonso, Nürnberg (DE)

(73) Assignee: MAN Nutzfahrzeuge AG (DE)

( * ) Notice: Under 35 U.S.C. 154(b), the term of this patent shall be extended for 0 days.

(21) Appl. No.: 09/363,240

(22) Filed: Jul. 28, 1999

(30) Foreign Application Priority Data

Jul. 28, 1998 (DE) .............................................. 198 33 841

(51) Int. Cl.[7] .............................. B60Q 1/04; B60Q 1/02; H02J 1/12
(52) U.S. Cl. ......................... 318/149; 318/443; 307/10.8; 315/83
(58) Field of Search .................................... 318/430–450, 318/139, 140–150; 320/132, 135.35, 136, 19; 324/427; 307/46, 10.8; 315/147, 83, 77, 82, 137; 361/190, 170; 340/468, 469, 472

(56) References Cited

U.S. PATENT DOCUMENTS

| | | | |
|---|---|---|---|
| 4,308,492 | * | 12/1981 | Mori et al. ............................... 320/32 |
| 5,038,728 | * | 8/1991 | Yoshida et al. ................... 123/198 R |
| 5,080,059 | * | 1/1992 | Yoshida et al. ................... 123/198 R |
| 5,170,107 | * | 12/1992 | Araki ..................................... 318/443 |
| 5,235,250 | * | 8/1993 | Cronk ..................................... 315/82 |
| 5,444,307 | * | 8/1995 | Sheets et al. ........................ 307/10.8 |
| 5,449,974 | * | 9/1995 | Dunbar .................................... 315/82 |
| 5,517,065 | * | 5/1996 | Kover ................................... 307/10.8 |
| 5,523,630 | * | 6/1996 | Smelley et al. ...................... 307/10.8 |
| 5,589,716 | * | 12/1996 | Dailey .................................. 307/10.8 |
| 5,592,146 | * | 1/1997 | Kover ................................... 340/468 |
| 5,661,368 | * | 8/1997 | Deol et al. ............................. 315/82 |
| 5,666,005 | * | 9/1997 | Watford ............................... 307/10.8 |
| 5,783,872 | * | 7/1998 | Blair ........................................ 307/46 |
| 6,037,749 | * | 3/2000 | Parsonage ........................... 320/132 |

FOREIGN PATENT DOCUMENTS

| | | |
|---|---|---|
| 43 38 462 A1 | 5/1995 | (DE) . |
| 44 99 650 T1 | 6/1995 | (DE) . |
| 195 03 315 A1 | 8/1995 | (DE) . |
| 0 391 065 A2 | 10/1990 | (EP) . |

* cited by examiner

*Primary Examiner*—Paul Ip
(74) *Attorney, Agent, or Firm*—Robert W. Becker & Associates

(57) ABSTRACT

A device for compensation of voltage drop at light sources of a vehicle has light sources having a resistance $R_0$ and connected to a vehicle battery. An auxiliary charging device with electric motor is provided. The electric motor has an on/off switch and is connected to the vehicle battery. The electric motor is connected parallel to the light sources. A resistor is serially connected upstream of the light sources and is selected, based on the resistance $R_0$, such that a nominal current I flowing through the light sources causes a voltage drop $\Delta E = I \times R$ in the resistor that matches a voltage drop occurring when the electric motor is switched on. A first switch is connected parallel to the resistor for short-circuiting the resistor when the electric motor is switched on by the on/off switch.

2 Claims, 1 Drawing Sheet

DEVICE FOR COMPENSATION OF VOLTAGE DROP AT LIGHT SOURCES OF A VEHICLE WITH ELECTRICAL AUXILIARY CHARGING DEVICE

BACKGROUND OF THE INVENTION

The present invention relates to a device for compensation of voltage drop at light sources of vehicles having an electrical auxiliary charging device, wherein the auxiliary charging device is comprised of an electric motor and a compressor. The electric motor is supplied with electricity by the vehicle battery, and the light sources and the auxiliary charging device are connected in parallel.

From German patent application 44 99 650 it is known to provide, in addition to the exhaust gas turbo charger, an electrically operated charger which is arranged upstream of the exhaust gas turbo charger and which is activated only in the phase of running up the internal combustion engine in order overcome the so-called turbocharger lag. The electric motor of the charger is supplied with electrical energy by the vehicle battery. Once the exhaust gas turbocharger provides enough charging air, the electric charger can be switched off and bypassed by a switch valve. A disadvantage of such a device is the great voltage drop at the terminals of the vehicle battery when the electric motor is switch on. During operation of such a device, the light output of light sources of the vehicles will show a distinct drop caused by the voltage drop since the light sources are also supplied by the vehicle battery. The light sources in question are, for example, the exterior lights and the passenger compartment lights.

It is therefore an object of the present invention to provide a means for maintaining at a constant level the light output of light sources of a vehicle, especially such light sources which are provided to increase vehicle safety.

SUMMARY OF THE INVENTION

This object is solved in that a resistor is serially connected to the parallel-connected light sources so that the parallel-connected light sources are operated at reduced voltage during regular operation whereby the lamps are designed such that the required light output (illumination) is provided. Upon switching on the electric motor of the auxiliary charging device, the resistor is bridged so that the voltage drop which is caused by the electric motor is compensated and the light sources maintain the desired level of illumination.

In a further embodiment of the invention, a first switch, which is embodied as a solenoid, is closed upon closing the circuit by the on/off switch for actuating the auxiliary charging device. Only when the main switch is actuated, the first switch can be closed by closing the circuit via a second switch.

BRIEF DESCRIPTION OF THE DRAWING

The object and advantages of the present invention will appear more clearly from the following specification in conjunction with the only drawing showing a circuit diagram of the inventive device.

DESCRIPTION OF PREFERRED EMBODIMENT

Figure 1:
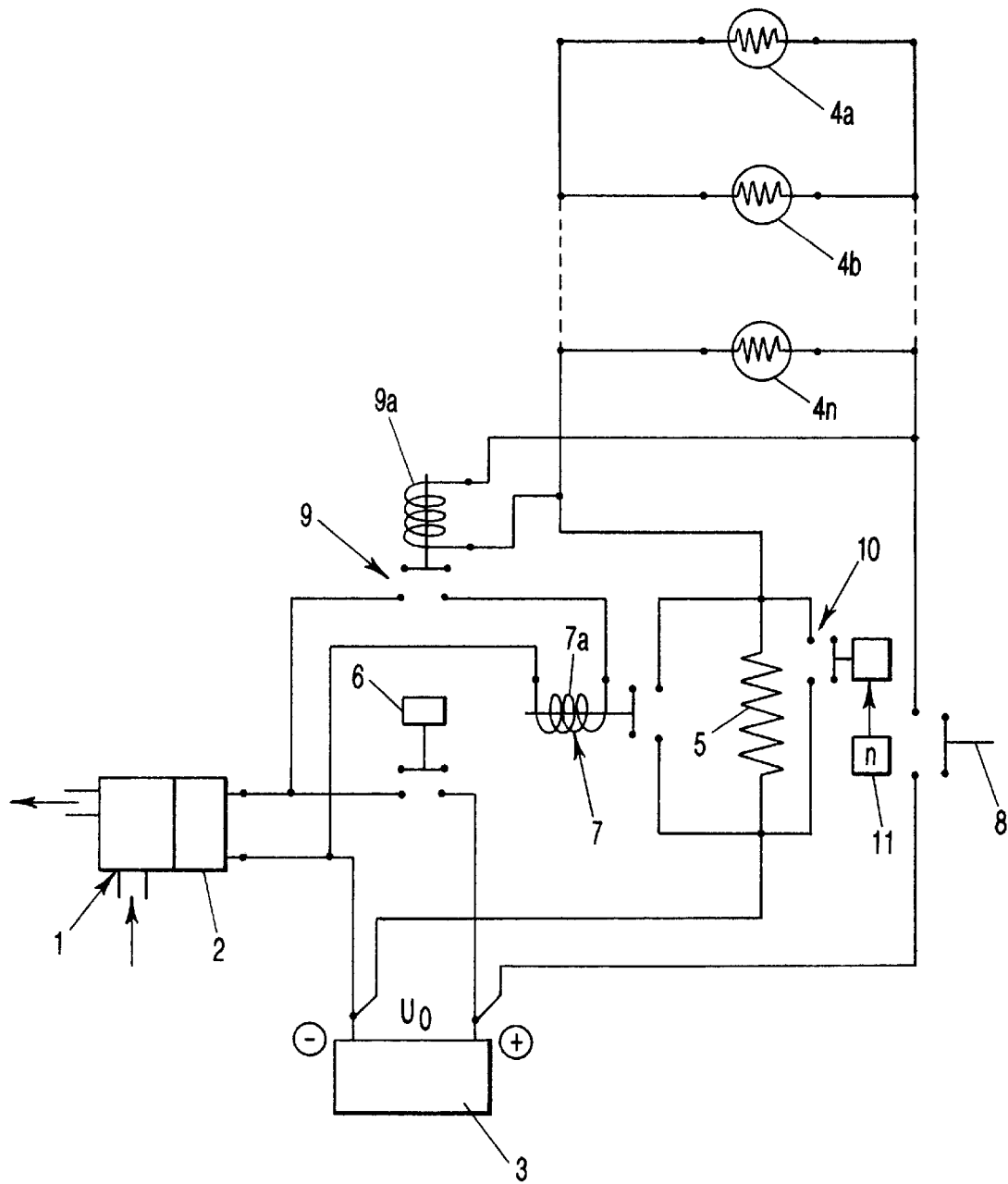

The present invention will now be described in detail with the aid of a specific embodiment utilizing the only FIGURE.

An auxiliary charging device 1 is operated by an electric motor 2 which is supplied with electrical energy by the vehicle battery 3. The vehicle battery 3 also provides the parallel-connected light sources 4a through 4n with electricity. A resistor 5 is inventively connected serially to the light sources 4a through 4n. This resistor 5 is selected such in relation to the resistance $R_0$ of the parallel-connected light sources 4a through 4n that for a nominal voltage $U_0$ at the terminals of the vehicle battery 3 the light sources 4a–4n will emit their desired (normal) light output.

When the on/off switch 6 of the circuit across the electric motor 2 is closed, a voltage drop $\Delta E$ occurs at the terminals of the vehicle battery 3.

In order to compensate this voltage drop, a first switch 7 with coil 7a is connected parallel to the resistor 5 so that the resistor 5 is short-circuited in order to provide at the parallel-connected light sources 4a through 4n again the same voltage present before actuation of the on/off switch 6 and now reduced by the voltage drop $\Delta E$ at the resistor 5 relative to the nominal voltage $E_0$.

The light sources 4a through 4n are operated by actuation of the main switch 8. Upon closing of the main switch 8, a second switch 9 with coil 9a, connected in parallel to the circuit of the light sources 4a through 4n, is activated which closes the circuit across the first switch 7. When the electric motor 2 is now switched on by actuating the on/off switch 6, the switch 7 is closed by the coil 7a. As mentioned before, the resistor 5 is short-circuited and the voltage drop for the light sources 4a through 4n is prevented so that the light sources 4a through 4n, despite the voltage drop $\Delta E$ at the battery, maintain their light output substantially at the same level of illumination. The switches 7 and 9 are advantageously embodied as solenoid switches.

The light sources 4a through 4n shown in the only FIGURE can be, for example, the interior lighting of a vehicle passenger compartment. It is understood that the circuit shown in the only FIGURE can also be used for vehicle headlights. Instead of the light sources 4a through 4n, headlights are then provided whereby the circuit remains otherwise unchanged. The resistor 5 must then, of course, be matched to the resistance of the headlights, as has been mentioned in regard to the light sources 4a through 4n in the previous discussion.

The inventive device is limited to light sources which are in operation at night when the auxiliary charge device 1 is switched. Brake lights are therefore not to be included.

The resistor 5 can be short-circuited by another switch 10 when the engine rpm is zero. The actuation of the third switch 10 is realized by a control unit 11.

The use of the third switch 10 prevents losses at the resistor 5 when the engine is turned off, for example, when the vehicle is parked at respective terminals or in parking lots. When the engine is turned off, the voltage at the vehicle battery 3 is already reduced because the alternator is not operating so that the voltage drop at the resistor 5 is undesirable. The light sources 4a through 4n have a substantially unchanged light output when the switch 10 short-circuits the resistor 5 during engine shut-down.

The invention is to be explained in the following with an example in regard to five lamps operating at 40 W for illuminating the passenger compartment with a total of 200 W. This corresponds for a nominal voltage of 24 V to a current of 8.3 A. The use of an electrical auxiliary charging device causes a voltage drop $\Delta E$ of approximately 3 V which can be compensated by short-circuiting the resistor 5, switched in series to the light sources, when this resistor 5 causes a voltage drop of 3V for a current of 8.3A. The resistance R is thus R=E to I=3 to 8.3=approximately 0.35 $\Omega$. The resistance power is thus P=E×I=3×8.3=25 W.

The specification incorporates by reference the disclosure of German priority document 198 33 841.4 of Jul. 28, 1998.

The present invention is, of course, in no way restricted to the specific disclosure of the specification and drawings, but also encompasses any modifications within the scope of the appended claims.

What is claimed is:

1. A device for compensation of voltage drop at light sources of a vehicle, said device comprising:

light sources (4a–4n) having a resistance $R_0$ and connected to a vehicle battery (3);

an auxiliary charge device (1) comprising an electric motor (2);

said electric motor (2) having an on/off switch (6);

said electric motor (2) connected to the vehicle battery (3) and connected parallel to said light sources (4a–4n);

a resistor (5) serially connected upstream of said light sources (4a–4n), wherein said resistor (5) is selected, based on said resistance $R_0$ such that a nominal current I flowing through said light sources (4a–4n) causes a voltage drop $\Delta E = I \times R$ in said resistor (5) that matches a voltage drop occurring when said electric motor (2) is switched on;

a first switch (7) connected parallel to said resistor (5) for short-circuiting said resistor (5) when said electric motor (2) is switched on by said on/off switch (6).

2. A device according to claim 1, comprising a main switch (8) for actuating said light sources (4a–4n) and a second switch (9), wherein said first and said second switches are solenoids, wherein said solenoid of said first switch (7) has a first coil (7a) connected parallel to said electric motor (2) and wherein said solenoid of said second switch (9) has a second coil (9a), wherein said second switch (9) is connected serially to said first coil (7a), wherein said second coil (9a) is connected parallel to said light sources (4a–4n), wherein said second switch (9) is closed when said main switch (8) switches on said light sources (4a–4n).

* * * * *